(12) United States Patent
Jenson et al.

(10) Patent No.: US 10,520,724 B2
(45) Date of Patent: Dec. 31, 2019

(54) MULTI-WAVELENGTH HEAD UP DISPLAY SYSTEMS AND METHODS

(71) Applicant: LightSpeed Interfaces, Inc., Everett, WA (US)

(72) Inventors: Barton James Jenson, Everett, WA (US); David Shannon, Sammamish, WA (US)

(73) Assignee: Automotive Visual Technologies, LLC, Seattle, WA (US)

( * ) Notice: Subject to any disclaimer, the term of this patent is extended or adjusted under 35 U.S.C. 154(b) by 368 days.

(21) Appl. No.: 15/419,343

(22) Filed: Jan. 30, 2017

(65) Prior Publication Data

US 2019/0018238 A1 Jan. 17, 2019

Related U.S. Application Data

(60) Provisional application No. 62/289,134, filed on Jan. 29, 2016.

(51) Int. Cl.
| | |
|---|---|
| *G02B 27/01* | (2006.01) |
| *G03B 21/14* | (2006.01) |
| *G02F 1/1362* | (2006.01) |
| *G06F 3/0482* | (2013.01) |

(52) U.S. Cl.
CPC ... *G02B 27/0101* (2013.01); *G02F 1/136277* (2013.01); *G03B 21/14* (2013.01); *G06F 3/0482* (2013.01)

(58) Field of Classification Search
CPC .. G02B 27/01; G02B 27/017; G02B 27/0093; G02B 27/0101; G02B 27/0172; G02B 27/0189; G02B 27/1006
See application file for complete search history.

(56) References Cited

U.S. PATENT DOCUMENTS

| | | | | |
|---|---|---|---|---|
| 7,397,606 B1* | 7/2008 | Peng | ................... | G02B 27/0101 |
| | | | | 359/630 |
| 9,076,368 B2* | 7/2015 | Evans | ...................... | G09G 5/02 |
| 2007/0218428 A1* | 9/2007 | Taffet | ....................... | G09B 9/16 |
| | | | | 434/41 |
| 2016/0109701 A1* | 4/2016 | Goldman-Shenhar | ...................... | |
| | | | | G02B 27/01 |
| | | | | 345/8 |
| 2016/0116736 A1* | 4/2016 | Andersson | ........... | G03B 21/2013 |
| | | | | 353/13 |
| 2017/0199396 A1* | 7/2017 | Knoll | ...................... | A61F 9/023 |

* cited by examiner

*Primary Examiner* — Sultan Chowdhury
(74) *Attorney, Agent, or Firm* — Olympic Patent Works PLLC

(57) ABSTRACT

The disclosure is directed to an optically transparent visual display system that superimposes information onto the field of vision of a pilot or vehicle operator utilizing multiple wavelengths in order to extend the operator's range of vision. The display format may be presented on a head-up display (HUD) in a covert manner using near infra-red (NIR) light that is viewable with standard issue night vision goggles (NVGs) such as the AN/PVS-7, but not viewable to the unaided eye. Display information may originate from multiple wavelength sensors and illuminators for enhanced environmental and situational awareness that extend beyond the five human senses. Direct view displays, such as LCDs and instrument or vehicle lighting systems, may utilize NIR wavelengths that are viewable with NVGs but are not viewable to the unaided eye.

19 Claims, 3 Drawing Sheets

MULTI-WAVELENGTH HEAD UP DISPLAY SYSTEMS AND METHODS

CROSS-REFERENCE TO RELATED APPLICATION

This application claims the benefit of Provisional Application No. 62/289,134, filed Jan. 29, 2016.

TECHNICAL FIELD

The present disclosure is directed to covert head up display systems.

BACKGROUND

Head up displays (HUDs) were originally developed to display cockpit, or vehicle instruments, to pilots and vehicle operators in a manner that overlays the instrumentation information onto a real world scene. A HUD accomplishes this with a transparent display that enables a pilot or vehicle operator, hereinafter also referred to as an operator or viewer, to keep their eyes trained on a real world scene while simultaneously viewing relevant information that is superimposed onto that scene. The benefits of HUD technology include: i) increased operator time looking forward at a relevant scene, such as the road or horizon, or conversely reduced time that the operator takes their eyes off of a relevant scene to look at instrumentation; ii) improved visual acuity by reducing the need for an operator to refocus their eyes on near objects, such as an instrument panel, and again refocus on far objects in a relevant real world scene, provided the HUD projects the instrumentation at a sufficiently far enough viewing distance; and iii) consolidation of information from multiple displays into a single display and in a simplified format that reduces the demand on an operator's cognitive processes when they should be focused on a primary task such as driving or flying. Contemporary applications of HUD technology include the display of video information, text messages from a second party such as a dispatch center, or from sensors or sources outside the vehicle occupied by the operator. Military HUD systems present tactical information to operators in a manner that also lets them keep their eyes looking forward and focused on critical tasks. However, military operations often occur at night, requiring the use of night vision devices (NVDs), also known as a night optical/observation devices (NODs) or night vision imaging systems (NVIS), for enhanced vision in the dark. Typically, NVDs are packaged into wearable devices such as the AN/PVS-7 and AN/PVS-14 night vision goggles (NVGs), which are commonly used by the US military and law enforcement agencies. These newer NVDs utilize technology designated as Generation III, which greatly amplify low light levels, and are necessarily designed to filter out much of the light output from instrument panels and interior lighting systems so that the operator is not overwhelmed by their light output.

DETAILED DESCRIPTION

Head up display (HUD) systems that present information to a pilot, or vehicle operator for enhanced environmental and situational awareness are described. The HUD information is presented in a format that is immediately understood, up to and including all five senses, and works with extended senses. For example, viewing is extended to include the near infrared (NIR) with night vision goggles. The information presented is received from one or more sources or inputs, such as the vehicle instrumentation, communications equipment, or from multiple wavelengths sensors and illuminators. The multi-wavelength sensors and illuminators extend situational awareness to include information that is outside of the normal five senses and provides additional capabilities (e.g. viewing through obscurants, highlighting living objects, etc.). The NIR display option enables military vehicles to remain covert in darkness while utilizing standard issue night vision goggles to view the HUD.

Figure 1:
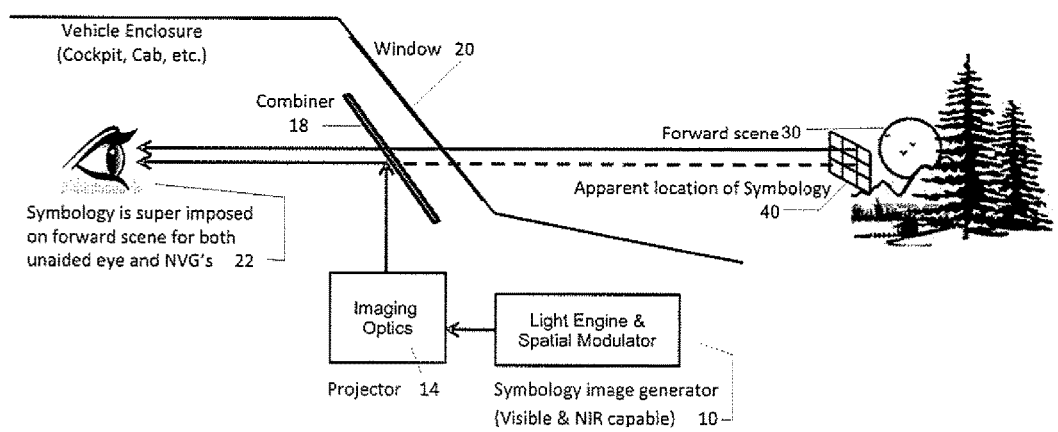
FIG. 1 shows a schematic representation of a head up display that combines symbology and video information onto a forward scene.

FIG. 1 shows a schematic representation of a HUD that combines symbology and video information onto a forward scene. A light engine 10 contains one or more LEDs, or lasers, along with a spatial modulator, which may comprise a liquid crystal display (LCD), liquid crystal on silicon (LCOS) device, or digital light projector (DLP). The light engine 10 may generate visible or NIR light for subsequent imaging by the projector 14. This assembly creates an image 40 that is projected onto the combiner 18 and appears to the viewer 22 as if the image 40 is superimposed on a forward scene 30, as shown in FIG. 1. The image 40 may be formatted to display symbology or video information with visible light that can be viewed with the unaided eye, or with low intensity visible light or NIR light that can be viewed with NVGs. The forward scene 30 may be of anything in the natural world viewed by the pilot or vehicle operator 22, including, but not limited to, roads, sky, buildings, and terrain. The image 40 may be a picture, video, or other symbology. Imaging optics 14 transforms the image of the light engine and spatial light modulator 10 so that the image can be projected onto the combiner 18 and appears superimposed on the forward scene 30 to the viewer 22 as shown in FIG. 1. The imaging optics 14 comprises a variety of refractive and/or reflective optical components. The imaging optics 14, can include a telescope, that focuses the symbology such that the symbology can be superimposed onto the forward scene 30 to appear at any appropriate distance from the viewer. Various configurations of imaging optics designed to create a virtual image, such as images produced by HUDs, are well known to those skilled in the art. The combiner 18 comprises glass, plastic, window coating, or a waveguide located between a window 20 of the vehicle and the viewer 22. The combiner 18 reflects the symbology back toward the viewer 22 and transmits the forward scene 30 in a manner that superimposes the image 40 onto the forward scene 30 and viewer 22 is able to see both the forward scene and the image. The combiner 18 can be coated with any of a variety of optical filters that transmit and reflect selected portions of the light spectrum.

The HUD, whether aftermarket or original equipment manufacturer (OEM), projects symbology and images 40 in monochrome, and/or color, and/or NIR wavelengths, e.g., wavelengths between 720 nm and 880 nm. In one embodiment, a projection wavelength of 860 run is chosen, which enables viewing with standard issue night vision goggles (e.g. AN/PVS-7), and will be covert to unaided human vision both inside and outside the vehicle. Human vision typically responds to wavelengths between 400 nm and 720 nm. Thus, the 860 nm projection wavelength is sufficiently above human unaided vision. This projection wavelength can be accomplished through a custom combiner 18 located in front of or on the window 20. The combiner 18 is partially or substantially reflective of incident wavelengths of light at 860 nm and partially reflective in the visible wavelengths. The combiner is also substantially transmissive of visible wavelengths and at least partially transmissive of a portion of the NIR spectrum. Vehicle instrumentation lighting may be off during covert mode and only displayed on the NIR HUD. The visible projection wavelength provides a monochrome, or color HUD for a viewer with no vision enhancement headgear. The HUD can be switched between various wavelength bands without having to physically switch pieces of equipment.

Several problems are solved with respect to covert operation of HUDs, and their use in tactical situations benefiting from extending viewable information outside of the normal 5 senses. The HUD projects symbology and images into the viewer's central forward view via a combiner 18 as depicted in FIG. 1. The image is collimated by the imaging optics to appear at near infinity without any re-direction of gaze or any re-accommodation distance. The information projected by the imaging optics in combination with the combiner can be quickly assimilated by the viewer. When using NVG the viewer may see the HUD information super imposed on the forward scene just as the information would appear without NVG. Because the HUD image is collimated there is no focusing problem. But, with current NVDs and HUD technology there will be a brightness problem. That is, if the HUD only displays in the visible portion of the spectrum, the Automatic Gain Control (AGC) of the NVG suppresses the forward view and only "see" the HUD. Conversely, the HUD display may be too dim to register in the NVG's when the AGC is correctly adapted for the forward view 30. This problem is solved in one embodiment by projecting the symbology at 860 nm by using NIR LED's in the light engine 10 and using a dichroic filter on the combiner 18. Other embodiments of the system may employ NIR lasers in the light engine 10. This technique allows the HUD architecture to work seamlessly for unaided viewing as well as viewing with unmodified NVG's. The imaging optics may be designed to output low intensity NIR that is visible to the viewer 22 using NVGs due to close proximity to the projector, yet covert due to the imaging optics providing a narrow output field of view, or limited eye-box, and directed away from any undesirable observer, such as upward into the sky, or toward a light blocking element disposed on or near a portion of the windshield.

Figure 2:
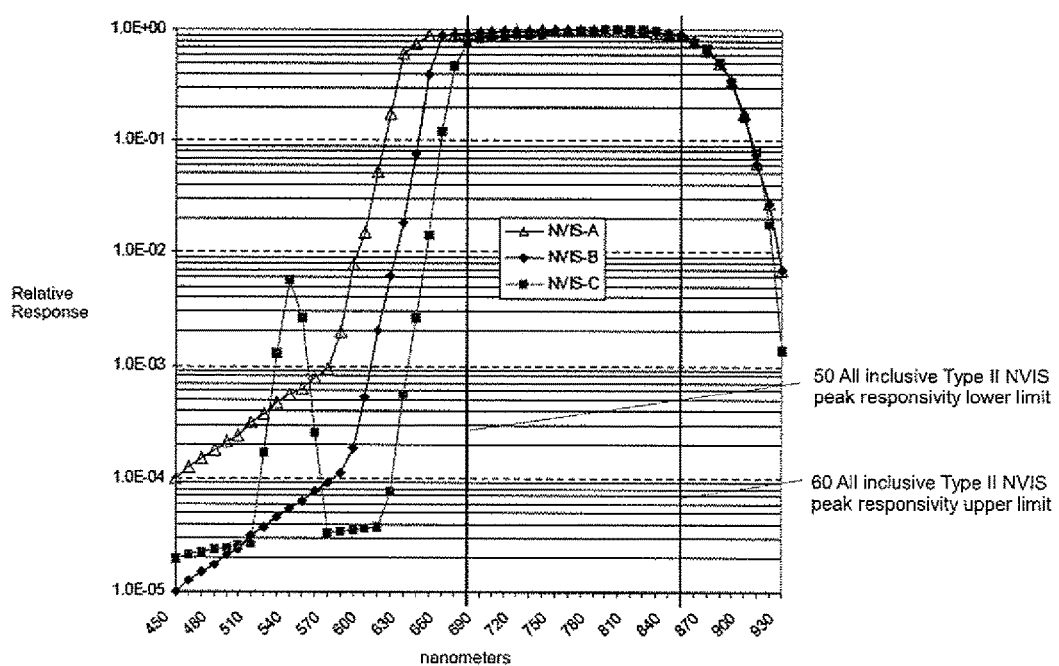
FIG. 2 shows a plot of relative spectral response characteristics of night vision imaging systems.

FIG. 2 shows the relative spectral response characteristics of class A, B, and C NVIS as defined in the Department of Defense document MIL-STD-3009 titled, "Lighting, Aircraft, Night Vision Imaging System (NVIS) Compatible". The wavelength range between the two vertical lines 50 and 60 shown on FIG. 2 comprise the range of wavelengths that Generation III, Type II NVGs are most sensitive to. The lower limit for all Type II NVIS classes (i.e. A, B, and C) peak responsivity is shown with line 50 at approximately 690 nm. The upper limit for all Type II NVIS classes (A, B, and C) peak responsivity is shown with line 60 at approximately 860 nm. The highest wavelength that the human eye is sensitive to is typically 720 nm.

Figure 3:
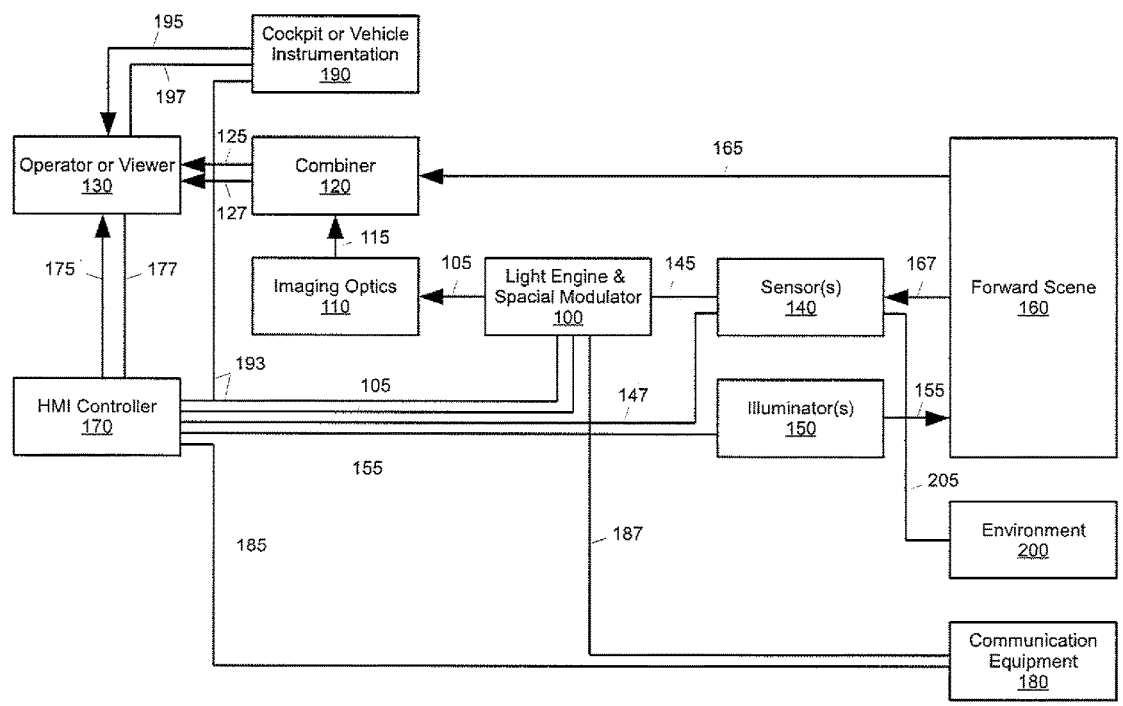
FIG. 3 shows a block diagram of various components of a head up display.

FIG. 3 shows a block diagram of various components within the HUD system. Light 165 that is within the field of vision of a viewer 130 from a forward scene 160 is incident upon a combiner 120. A portion of the incident light 125 is viewable by the viewer after passing through the combiner. The light 165, and thus a subsequent portion of light 125 may comprise visible and NIR wavelengths viewable to the viewer either unaided or with a NVD. Light 167 that is from the forward scene is incident upon one or more sensors 140, and is not necessarily within the field of vision of the viewer. The sensor(s) can receive visible or invisible light from the forward scene, or may be able to receive information from the environment 200 by means of visible or invisible light sensors directed toward scenes other than the forward scene. The sensors may also obtain information about the environment by means of other physical measurements such as with milli-meter wave sensors, temperature sensors, etc. The sensor(s) convert optical information from the forward scene and/or information from the environment into video or symbology information that is transmitted to the light engine and spatial modulator 100 over a communication link 145. Alternatively, the sensors may send information pertaining to the forward scene or environment to a human-machine interface (HMI) controller 170 over a communication link 147. The HMI controller can interpret the sensor information and in turn send video or symbology information containing information from the forward scene or the environment to the light engine and spatial modulator via a communication link 105. The video or symbology information provided by the sensors or HMI controller may be unchanged, or reduced, or modified prior to being sent to the light engine and spatial modulator. The video or symbology information sent to the light engine and spatial modulator from the one or more sensors, and/or from the HMI controller may be comprise a variety of formats including, but not limited to NTSC/PAL, or HDMI. Alternatively, the video or symbology information can be digitally encoded on the communication links configured appropriately such as that found on Ethernet, USB, Bluetooth, WiFi, or other wired or wireless types of communication links. The light engine and spatial modulator 100 can receive various video or symbology information over the communication link and interpret that information with a video decoder, or with a digital communication link with appropriate receiver and/or microprocessor. A video decoder, communication link receiver, and/or microprocessor can be incorporated into the light engine and spatial modulator in a number of ways. For example, projectors, TVs, monitors and various displays all incorporate variations of video decoders and/or communication links as described above. The light engine and spatial modulator 100 can be controlled by the HMI controller via the communication link 105. The one or more illuminators 150 may augment the performance of the one or more sensors 140 by illuminating the forward scene with light appropriate for associated sensor operation. The illuminator(s) may be controlled by the HMI controller via a communication link 155. A more detailed description of illuminators is provided later. The light engine and spatial modulator 100 generates an image with a display component (i.e. spatial modulator) such as, but not limited to, a liquid crystal display (LCD), or liquid crystal on silicon (LCOS), or scanning mirrors, or micro mirror arrays. A light source (i.e. light engine) is often required in combination with the display component and can include, without being limited to, one or more light emitting diodes (LEDs), or one or more lasers. In some cases, the light engine and spatial modulator functions can be combined into a single assembly. The light engine and spatial modulator generates a primary image 105 that is suitable for re-imaging (e.g. magnification, and/or projection) by the imaging optics 110. The imaging optics transforms the image 105 into another image 115 that can subsequently be superimposed onto the viewer's field of vision by means of an optical combiner 120. The imaging optics in the simplest form comprise a positive lens (e.g. convex refractive lens, or concave reflective lens) with the image 105, or object, disposed on one side of the lens at the focal length of the lens, or at a distance from the lens that is less than the focal length of the lens. A virtual image 115 will be formed that appears on the same side as of the object if viewed from the side opposite the lens from the object. The combiner 120 is disposed to be within the field of view of the imaging optics and subsequently reflects the image 115 toward the viewer 130. The imaging optics may include an array of lenses, or telescope, which transforms (i.e. magnifies and projects) the object 105 into an image 115 that is suitable for a combiner to superimpose (e.g. partially reflect) that image onto a field of vision of the viewer. The combiner 120 may also be configured to function as one of the magnification or projection components when coupled with the imaging optics. That is, the combiner function may be consolidated with the imaging optics function. The combiner 120 is designed to be substantially transparent so that a viewer may see through it, or view a forward scene with only partial obstruction of the forward scene by the combiner. Moreover, the combiner 120 is partially reflective of light generated by the imaging optic such that the image created by the imaging optic is combined (i.e. superimposed) with the forward scene. Thus, the viewer sees a portion of light from the forward scene 125 simultaneously with a portion of light 127 from the image 115. The combined light of 125 and 127 form a superposition of the image 115 and forward scene. The combiner 120 is an optical component that possesses optical coatings and properties that substantially transmit light, both visible and invisible, as well as partially reflect light, both visible and invisible. In one embodiment, the combiner may substantially or completely reflect NIR light in a narrow band in order to facilitate compatibility of a NIR image 115 as well as prevent light leakage for additional covertness. The cockpit or vehicle instrumentation 190 may be controlled by the operator 130 for operation in standard mode that is visible with the unaided eye, or in covert mode that is visible with NVDs through an interface 197. The interface 197 may comprise manual controls, or automated electronic switching. Instrumentation images 195 can presented to the operator in visible light, and/or NIR light that is visible to the operator with NVDs. The HMI controller 170 can also gather information via communication link 193, for subsequent display on the HUD via communication link 105. Alternatively, the light engine and spatial modulator may be configured to receive appropriately formatted video and symbology information directly from the instruments over the communication link 193. The HMI controller 170 is a device designed to receive operator 130 commands via an interface 177, e.g. pushbuttons, touchpad sensors, camera sensors, voice command input, as well as provide feedback to the operator utilizing one of the five senses over the interface 177, e.g. haptics, or sound. The HMI controller can also provide visual feedback to the operator or viewer through a display configured for visible light output, and/or NIR light output that is visible with NVDs. Communication equipment 180 may extend the available information for viewing by the viewer. The communication equipment may include one or more wireless or wired receivers, and/or transmitters. Information received by the communication equipment may be sent to the HMI controller via a communication link 185, for subsequent processing and conversion into video and symbology information to be displayed on the HUD. Examples might include information from a dispatch center, or from other personnel outside of or inside of the vehicle occupied by the operator. Other examples include remote sensors not immediately connected to the vehicle occupied by the operator. The communication equipment may provide video or symbology information that can be received by the light engine and spatial modulator.

The brightness of the HUD light output 127 as well as the transmitted wavelengths may be switched by the user through the HMI controller. The brightness and wavelengths of the HUD light output may also be switched based on sensor inputs, such as with an ambient light photo sensor. At least three operational modes for the HUD may be defined as high output visible mode (Hi-Vis), low output visible mode (Lo-Vis), and covert mode (Cov-NIR). In high output visible mode, the HUD system produces high luminance images for the viewer, i.e. light 127 is of high enough luminance, comprised of visible wavelengths, for suitable viewing with the unaided eye during daytime. Images formed by the HUD may possess 250 cd/m$^2$ to 10,000 cd/m$^2$ or more of luminance when in Hi-Vis mode. In low output visible mode, the HUD system produces lower luminance levels for the viewer, i.e. light 127 is of lower luminance suitable for viewing with the unaided eye during night time or on dark days. Images formed by the HUD may possess 0.1 cd/m$^2$ up to 250 cd/m$^2$ or more of luminance when in Lo-Vis mode. In covert mode, the HUD produces images comprised of NIR light, or low intensity visible light, either of which are appropriate for viewing with NVDs during dark conditions, such as at night.

The HUD may be used with a variety of sensors and illuminators, with advantages described below, through standard electronic interfaces.

1. Thermal Band (8 micron to 12 micron)—The long wavelength band, which utilizes a sensor and possible illuminator, has the following advantages:
    a. This wavelength penetrates through fog or smoke and may provide images at a distance in front of the vehicle that are otherwise obscured at shorter wavelengths.
    b. Warm blooded living animals radiate their own illumination at a wavelength of roughly 9 micron. A thermal band camera automatically highlights these animals—giving an easy alert of living things that are in view of the vehicle. Combined with 1a), early warning of animate objects is possible.
    c. Several other uses are also possible—detection of warm vehicles that were recently operating, Vehicle operation at night that does not require an illuminator, viewing into areas of fire with enhanced smoke penetration such as a forest, house, or urban areas, etc.
2. NIR illuminator—An NIR illuminator on the front of the vehicle, or in proximity to the vehicle, will provide night vision capability for both NVG's directly OR the sensitive CMOS cameras. Additionally, a directed & collimated NIR beam can act as a pointer to identify objects to other vehicles or individuals clearly via night vision and remain covert to a common observer.
3. Future sensors—Camera/illuminator parings at any wavelength band may be incorporated into this system (e.g. specific wavelengths used in detection of specific chemical species). This opens the possibility of detecting and identifying specific chemicals in front of the vehicle prior to contact.
4. Synthetic vision—a digital terrain map can be correlated with a global positioning system (GPS) sensor and/or inertial guidance sensors to provide information to the vehicle operator about location and heading.

5. System level architecture and advantages—A smart phone in one embodiment coupled with an appropriate application program may be used as a HMI controller. Any of the prolific wireless technologies can be used to wirelessly aggregate any information sources into the smart phone that are not available directly.

Range gating any of the illumination sources in synchronization with the receiving camera may also be used to improve vision through obscurants.

Display formatting and medium bandwidth calculations will be accomplished in the smart phone. Real time, high bandwidth video manipulation (e.g. multi-wavelength image fusion or in-line video processing) may have a dedicated processing unit connected into the smart phone via wireless technology.

In one embodiment, a broadband and partially reflective filter may be used on the combiner 18 in FIG. 1 (or 120 in FIG. 3), wherein NIR light that escapes the vehicle is not visible to the unaided eye.

In another embodiment, a projection wavelength between 900 nm and 930 nm may be chosen since all classes of NVIS respond to those wavelengths, but typical CMOS and CCD cameras become less sensitive to these higher wavelengths, e.g. above 900 nm. Furthermore, the close proximity of a viewer using NVDs to the covert HUD will allow for low NIR light output, which will be difficult to see with aided vision at further distances outside the vehicle.

It is appreciated that the description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A head-up display (HUD) system comprising:
a symbology image generator that receives video or symbology information and forms an image at wavelengths inside and outside of the visible spectrum;
imaging optics to project the images into a region that may be combined with a viewer's field of vision; and
a combiner disposed between the viewer and a forward scene located within the viewer's field of vision, the combiner
partially reflecting selected portions of a light spectrum of the projected image and
partially transmitting selected portions of a light spectrum of the forward scene, wherein the combiner is partially transparent in the visible light spectrum and substantially reflects light in a portion of the near-infrared (NIR) wavelength range, and partially reflects at least a portion of the visible wavelength range.

2. The HUD system of claim 1 wherein the video or symbology information comprises output from one or more sensors.

3. The HUD system of claim 1 wherein the video or symbology information comprises a subset of information from vehicle instruments.

4. The HUD system of claim 1 wherein the video or symbology information comprises information from a communication system.

5. The HUD system of claim 4 wherein the communication system obtains information from one or more communications equipment operators; wherein
at least one of the equipment operators is located in proximity to the HUD system.

6. The HUD system of claim 1 further comprising a human machine interface controller comprising an interface that enables a user to select display content and spectrum of the display content on the projected image.

7. The HUD system of claim 2 wherein the interface enables the user to select from various sensors.

8. The HUD system of claim 2 wherein the interface enables the user to select from various vehicle instruments.

9. The HUD system of claim 2 wherein the interface enables the user to select from various portions of communication information.

10. The HUD system of claim 1 wherein the image generator, the projector and the combiner present an optical image in the NIR wavelength, which is not visible to the naked human eye.

11. The HUD system of claim 2 displays information from NIR or thermal band cameras, used with or without NIR or thermal band illuminators.

12. The HUD system of claim 1, wherein the combiner is partially reflective of wavelengths presented by the HUD projector, substantially suppresses visibility to persons or sensors not within the field of view and is substantially transmissive of other wavelengths desired for viewing through the HUD system.

13. The HUD system of claim 1 wherein the HUD symbology is displayed in substantially invisible light to the naked human eye, either at invisible wavelengths or significantly low luminance levels or both, and the HUD symbology is viewable with enhanced vision systems that are designed to convert invisible wavelengths to visible wavelengths, or sufficiently amplify low light levels to that which is viewable in a covert fashion.

14. The HUD system of claim 1 wherein the combiner is substantially transmissive in the visible light spectrum, and at least partially reflective for a narrow portion of the near-infrared (NIR) wavelength range, which is visible to night vision goggles, and is partially reflective for a portion or the visible wavelength range.

15. The HUD system of claim 1 displaying information in the viewer's field of vision in three modes;
high output visible mode, with luminance output in the visible light spectrum for standard operation in high brightness ambient lighting,
low output visible mode, with luminance output in the visible light spectrum for comfortable viewing in low brightness, such as a cloudy day or at night, and
covert mode, with luminance output in the NIR spectrum for viewing with night vision goggles.

16. The HUD system of claim 15, wherein the convert mode comprises at least one of emitting low luminance visible and invisible wavelengths that can be viewed with night vision goggles.

17. The HUD system of claim 15, further comprising operating covertly with no light output, and user touch, and with feedback to the user through at least one of vibration (haptics) and NIR symbology displayed on the HUD.

18. The HUD system of claim 1 further comprising a liquid crystal display (LCD), or liquid crystal on silicon (LCOS), or digital light projector (DLP), or other similar display component designed for operation with a NIR backlight or light source.

19. The HUD system of claim 1 further comprising a display system having at least one of a LCD, LCOS, and DLP that is viewed directly by a user and can form images in at least one of visible wavelengths and NIR that can be seen with night vision goggles.

* * * * *